United States Patent [19]

Lemoigne

[11] 3,809,342

[45] May 7, 1974

[54] PARACHUTE

[76] Inventor: Pierre Marcel Lemoigne, 103 Avenue Verdier, 92 Montrouge, France

[22] Filed: Sept. 29, 1969

[21] Appl. No.: 861,899

[30] Foreign Application Priority Data
Oct. 4, 1968   France .......................... 68.168720

[52] U.S. Cl. ............................................. 244/145
[51] Int. Cl. ........................................ B64d 17/02
[58] Field of Search ............ 244/145, 152, 142, 138

[56] References Cited
UNITED STATES PATENTS

| | | | |
|---|---|---|---|
| 2,458,264 | 1/1949 | Hart | 244/152 |
| 2,527,553 | 10/1950 | Ingels | 244/145 |
| 3,043,543 | 7/1962 | Istel et al. | 244/152 |
| 3,099,426 | 7/1963 | Lemoigne | 244/145 |
| 3,298,639 | 1/1967 | Heinrich et al. | 244/145 |
| 3,504,874 | 4/1970 | Lemoigne | 244/142 |
| 3,298,635 | 11/1967 | Barish | 244/145 X |
| 3,298,640 | 1/1967 | Heinrich | 244/145 |
| 3,343,769 | 9/1967 | Basnett | 244/152 |
| 3,420,478 | 1/1969 | Ferguson | 244/145 X |

*Primary Examiner*—George E. A. Halvosa
*Assistant Examiner*—Sherman D. Basinger
*Attorney, Agent, or Firm*—Weiner, Basile and Weintraub

[57] ABSTRACT

The present invention relates to a parachute whose canopy includes means for imposing a directed flow of air from one surface thereof towards the other to produce a horizontal component of translation and effect movement of the parachute along a longitudinal axis, and has at least one cut-out part extending in depth along said longitudinal axis from the edge of the canopy substantially to the marginal part of the canopy which is substantially vertical when the parachute is in flight. The cut-out part may be provided in either or both of the leading edge of the canopy and the trailing edge of the canopy.

3 Claims, 9 Drawing Figures

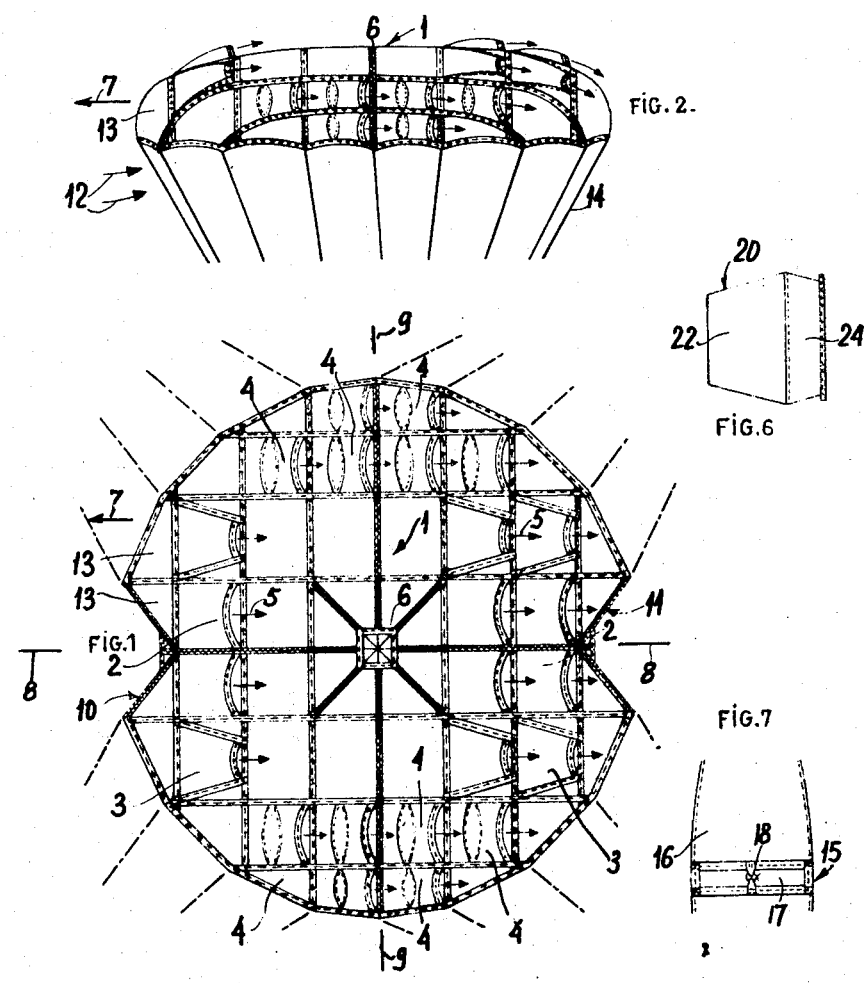

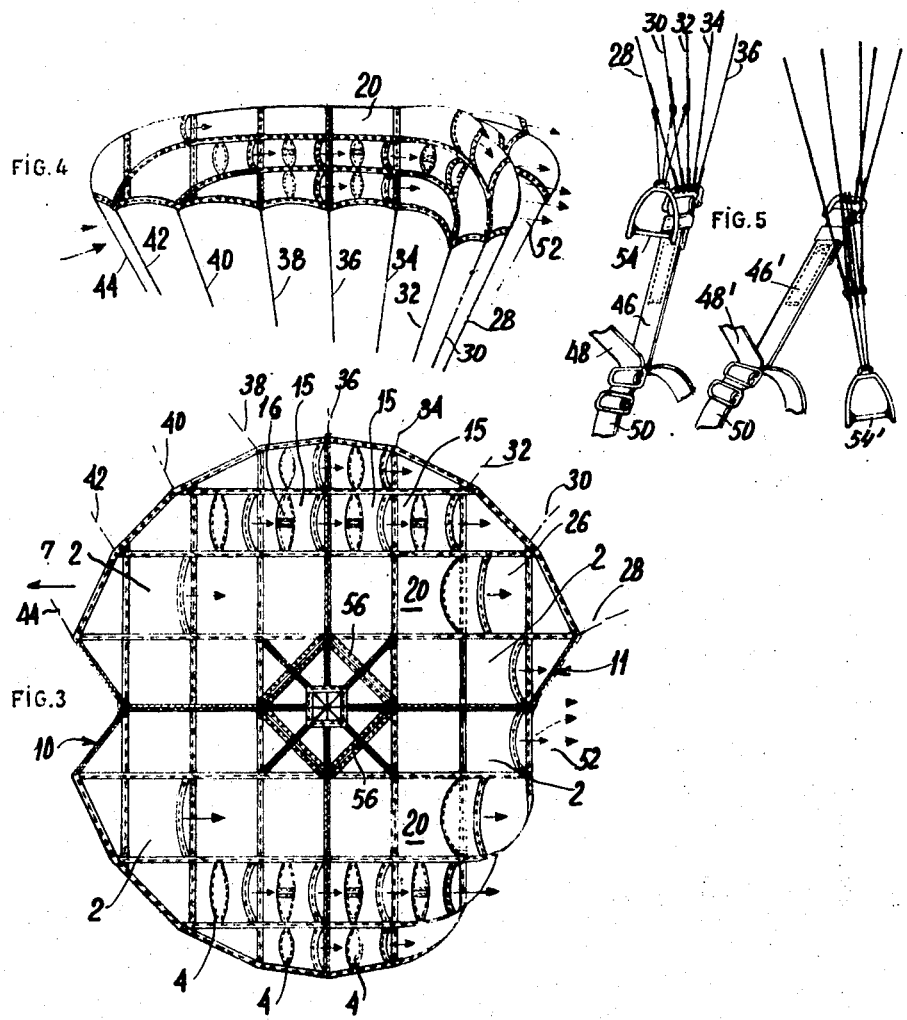

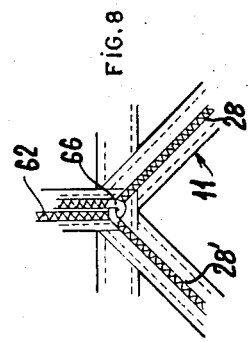
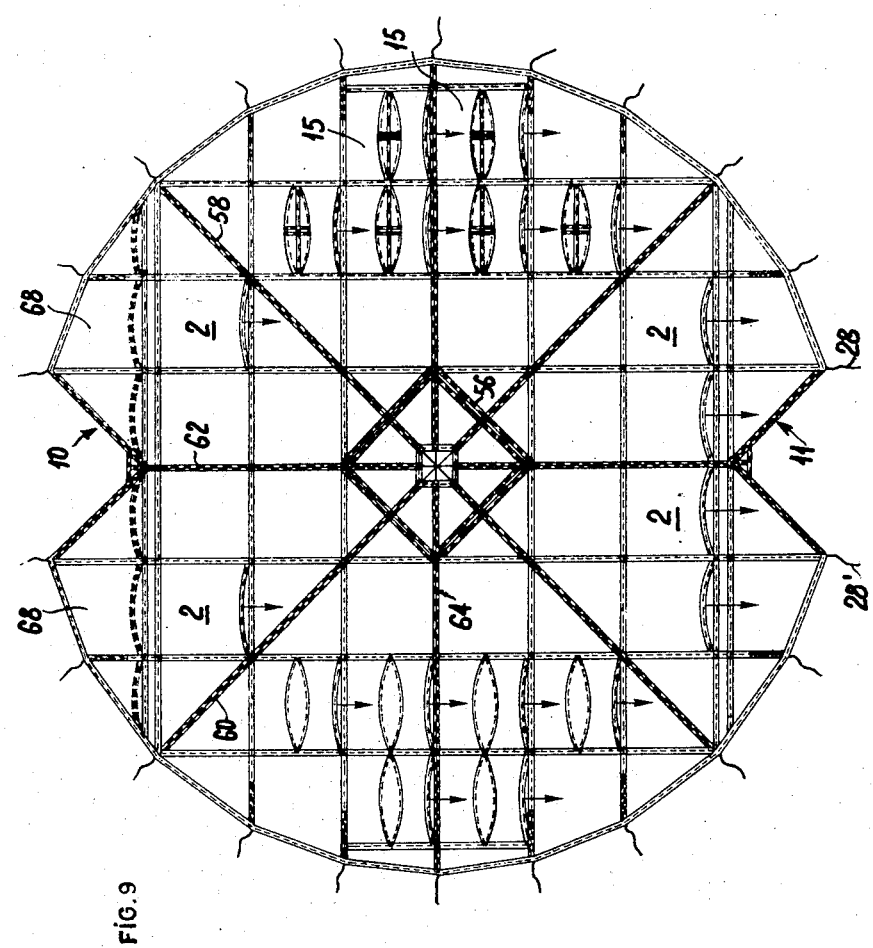

PARACHUTE

The present invention concerns a parachute with improved air circulation.

For some years parachutes have been developed and used whose canopy includes means for producing an asymmetrical airflow relative to the vertical axis passing through the apex of the canopy. These means are most often constituted by slots or nozzles allowing a flow of air to escape from one face of the canopy toward the other and directing this flow of air in a determined direction in order to cause a horizontal component of movement. Such parachutes are hereinafter called "parachutes of the kind stated".

Parachutes of the kind stated are thus capable of descending along a trajectory which diverges considerably from the vertical, and can "glide" to a certain extent in order to reach a touchdown point distant from the drop point. In the case of such parachutes, capable of being displaced in the horizontal direction, the canopy can therefore be considered to have a "forward" part, a "rear" part, and a longitudinal axis of translation, since the behavior is no longer symmetrical relative to a vertical axis passing through the apex of the canopy as with former parachutes.

On the other hand, in parachutes of the kind stated controllable means, which may also be wholly or partly constituted by slots or nozzles, deflecting panels, etc., allow voluntary production of disymmetry in the flow relative to the longitudinal axis in order to turn the parachute and to steer the parachute towards the selected touchdown point.

Thus devices have been developed which may be described as steerable gliding parachutes.

However, such devices have certain faults which the present invention seeks to remedy.

Thus, with increased horizontal speed, which may be of the order of the speed of vertical descent, the forward edge of the canopy operates under unfavorable conditions. This forward edge, which thus forms the leading edge of the canopy, indeed tends to go back into the interior of the canopy under the effect of the horizontal component of the relative wind. Under these conditions, the inner surface of the forward part of the canopy is poorly supplied with air and the leading edge may even assume a concave profile with little lift, which can bring about an irregular flow pattern impairing the efficiency of the canopy.

Another drawback in parachutes of the kind stated appears during maneuvers which may be carried out by the parachutist in order to turn. In general, in order to turn to one side, the parachutist causes a deformation in the rear part of the canopy, on the side towards which he wishes to turn. This deformation may simply be obtained by traction on the corresponding rigging-lines or by traction on control lines controlling the shape or cross-section of certain openings, slots or nozzles provided in the corresponding part of the canopy.

Whatever the method employed, the normal air flow in the relevant part is deviated, causing the desired turn. However, at least part of the streams of air thus deflected is directed towards the opposed rear part of the canopy where the flow is uselessly disturbed and may take on a turbulent pattern both impairing the lift and the efficiency of the turn.

Finally, parachutes of the kind stated generally cause a considerable shock on opening.

Thanks to the invention, these various drawbacks are eliminated or to a large extent reduced.

According to the invention, in a parachute of the kind stated, at least one cut-out part is provided in the edge of the canopy and on its longitudinal axis. The cut-out part preferably extends in depth substantially to the marginal part of the canopy which is substantially vertical when the parachute is in flight.

According to one embodiment of the invention, such a cut-out part is provided in the leading edge of the canopy, at the middle of this leading edge, i.e. along the longitudinal axis of the canopy, thanks to which the inner surface of the forward part of the canopy is better supplied with air when the horizontal component of movement is considerable.

According to another embodiment of the invention, a cutout is provided on the trailing edge of the canopy, along the longitudinal axis of the latter, thanks to which the air deviated during turning or braking maneuvers may escape from the canopy without disturbing the flow pattern in the rest of the canopy.

According to a preferred embodiment of the invention, a cut-out part is provided both in the leading edge and in the trailing edge, both being centered on the longitudinal axis of the canopy. Thanks to this preferred arrangement, the circulation of air is improved for all flight configurations of the parachute.

The invention may be applied to all parachutes of the kind stated, but among those, it is of particular advantage when applied to parachutes described in the specification accompanying my co-pending application Ser. No. 708,228 filed Feb. 22, 1968, now Pat. No. 3,504,873.

The invention will be better understood on reading the following detailed description and on examining the accompanying drawings which show, by way of example, several embodiments of the invention.

In the drawings:

FIG. 1 is a plan view of the canopy of a parachute according to the invention;

FIG. 2 is an elevation of the same canopy;

FIGS. 3 and 4 are two similar views of a canopy according to another embodiment of the invention, the canopy being shown in the deformed condition which can be brought about by the parachutist in order to turn left;

FIG. 5 is a partial view of the harness and the liftwebs of the parachute of FIGS. 3 and 4;

FIG. 6 is a plan view of one of the nozzles of the parachute of FIGS. 3 and 4;

FIG. 7 is a partial plan view of another nozzle of the parachute of FIGS. 3 and 4.

FIG. 8 is a detailed view of an embodiment of the reinforced constructions assembly of the cut-out part in a parachute according to the invention; and FIG. 9 is a plan view of another embodiment of a parachute canopy according to the invention.

The canopy 1 of the parachute shown in FIGS. 1 and 2 comprises a number of nozzles 2, 3, 4 all of whose escape orifices are turned in the same direction, the escape of air towards the rear being represented by short arrows 5. This asymmetrical arrangement of the nozzles relative to the vertical axis passing throughout the apex 6 of the canopy produces, in flight, a horizontal component of movement tending to carry the parachute along in the direction of arrow 7. The parachute may thus be considered to have a longitudinal axis 8—8 and a transverse axis 9—9. As the parachute has a well-defined direction of movement, that of arrow 7, the terms forward part of the canopy and rear part may be used to denote the parts of the canopy located respectively forward of and rearward of the transverse axis 9—9 relative to the direction of movement of the parachute.

The canopy of the parachute shown in FIG. 2 has, in plan, the shape of a multiple-sided polygon which can be inscribed in a circle, but the contour might be inscribed in another rounded figure, for example an ellipse.

According to the invention, the canopy comprises, centered on its longitudinal axis 8—8, at least one cut-out 10 and/or 11, which extends in depth, i.e. towards the center 6 of the canopy, to the peripheral part of the canopy which is substantially vertical when the parachute is in flight (see FIG. 2).

The forward cut-out, which is for example triangular in shape, favors the supply of air to the forward part of the interior of the parachute (see arrows 12, FIG. 2), preventing the front of the canopy which forms the leading edge 13, from going back towards the center of the canopy as a result of the relative wind created by the horizontal component of movement.

Thus the leading edge 13 retains a convex aerodynamic profile, avoiding turbulent airflows. At the same time the efficiency of the nozzles situated at the forward part of the canopy is improved.

The rear cut-out part 11, which is likewise preferably triangular in shape, favors the circulation of air in the longitudinal direction of the canopy, and consequently increases in degree the horizontal component of movement. At the same time, as the circulation of air is increased in the longitudinal direction, the presence of the cut-out part 11 at the trailing edge contributes, with other means which will be referred to hereinafter, following, in giving the canopy a flatter shape (see FIG. 2).

Finally, the cut-out part at the trailing edge 11 has a considerably beneficial effect when the parachutist voluntarily deforms the canopy in order to turn. This effect will be described at more length with reference to FIGS. 3 to 5 in which the canopy is shown in the left-turn configuration.

In the embodiment shown in FIGS. 1 and 2, the invention is applied to a parachute of the type described in the patent specification aforesaid, i.e., in which the canopy is constituted by an assembly of substantially square elementary panels, and not by an assembly of radiating triangular gores. On the other hand, the panels close to the periphery of the canopy, for example the two rows of panels closest to the periphery, are made of fabric of low porosity or even of no porosity, while the panels forming the centre of the canopy are made of fabric of a greater porosity.

Finally, there are provided on the marginal lateral parts of the canopy hollow-profiled nozzles 4 which diminish in cross-section in both directions from the center and which have been described in the specification accompanying my co-pending application Ser. No. 682,228 filed Nov. 13, 1967, now Pat. No. 3,508,726.

These various provisions, supplemented by the provision of the cut-outs 10, 11, combine to give the canopy in flight a relatively flat configuration which allows the fitting of the canopy with rigging lines 14 connecting the periphery only of the canopy with the load (not shown) supported by the parachute. Consequently, it is unnecessary to mount central rigging lines, as required for the majority of steerable parachutes hitherto known, and this contributes to a large extent in a reduction of shock on opening of the canopy.

Finally, the circulation of air improved in the longitudinal direction by the presence of the two cut-out parts 10, 11, stabilises the trajectory of the parachute in the longitudinal direction and enables the omission of lateral stabilizer panels which are generally included in steerable parachutes heretofore known, and which act as rudders.

The parachute shown in FIGS. 1 and 2 comprises a number of nozzles 2, 3, 4 of a variety giving it considerably increased gliding and maneuvering properties. Such a parachute would be particularly suitable for competition jumping.

Parachutes according to the invention are also suitable for dropping heavy loads, illuminating flares, etc., possibly with remote control, which may be of interest in the case of recovery of loads or of pilotless devices.

One important application is that of parachutes for airborne troops, and an embodiment of a parachute for such application is shown in FIGS. 3 to 7 and 8 and 9.

The canopy shown in plan view in FIG. 3 is constituted by a number of elementary substantially square panels of which a certain number form or include nozzles. The front and rear nozzles 2 are simple nozzles formed by a trapezoidal fabric panel.

The lateral nozzles diminish in cross-section in both directions from the center, as in the case of FIG. 2, but certain of them, denoted by the reference numeral 15, may include, in the central lenticular panel 16, an anti-shock slot 17 normally kept closed by a tie 18 (FIG. 7). Certain of the nozzles, such as 20 (FIGS. 3 and 6), may be of divergent-convergent overlapping construction formed of two trapezoidal panels 22-24 of which the rearward panel 24 overlaps the next panel 26 in the rearward direction of the canopy.

Such a parachute may include, for example, on each side, five rear rigging lines 28, 30, 32 34, 36 and four forward rigging lines 38, 40, 42, 44. Each of these groups of rigging lines is joined respectively on a lift-web 46, 48, 46', 48', (FIG. 5) forming part of the harness 50.

By pulling on all or on some of the rear rigging lines on one side of the canopy, for example on the three lines 28, 30, 32, the parachutist can deform the corresonding angle of the canopy in order to turn. This configuration is represented in FIGS. 3 and 4 where the left-hand rear part of the canopy is lowered in order to turn to the left. The air deflected by this lowered part can escape through the rear cut-out part 11 (see the arrows 52) without striking the right-hand rear part of the canopy, as has been the case with hitherto-known parachutes.

The result is that, on turning, the airflow in the opposed half of the canopy is not disturbed, which does not reduce the lift, and considerably increases the control efficiency.

Naturally, as is conventional, when the two rear angles of the canopy are lowered at the same time, efficient braking is obtained. It is advantageous to unite the control lines, for example lines 28, 30, 32 to a control handle 54, 54' respectively, within reach of the parachutist.

As shown in FIG. 3, anti-shock slots 56 can likewise be provided in the vicinity of the center of the canopy.

In the embodiment shown in plan in FIG. 9, the canopy is likewise formed mainly of substantially square elementary panels, except of course at the periphery where certain panels are triangular or trapezoidal in order to obtain a shape which is substantially inscribable in a circle. As a variant, reinforcements have been provided along the diagonals 58, 60 as well as, possibly, on the longitudinal and transverse axes 62, 64. These reinforcements can be constituted by braids of ribbon stitched preferably into the fabric with the corresponding rigging lines or extensions of the latter.

One form of construction at the inner end of the cut-out part 11 (or 10) is shown in FIG. 8. The rigging lines 28, 28', or extension thereof, pass into a loop 66 formed by the line serving as a reinforcement along the longitudinal axis 62.

In addition to the different forms of nozzles 2–15 which have been described with reference to FIGS. 1 and 3, the canopy may also include nozzles 68 (shown in dotted lines in FIG. 9) mounted on the leading edge panels.

As a purely indicative measure it may be stated that a parachute with a surface area of 40 metres², made according to the invention, having neither central rigging lines nor stabilizer panels, has the following characteristics: speed of descent: 4.50 m/sec.; horizontal speed: 4 to 5 m/sec.; opening shock at a speed of 110 knots: 142 kg. It may be recalled that a conventional parachute canopy of 60 m² gives a touch-down velocity of 5 to 6 m/sec. and that the opening shock is of the order of 500 to 1000 kg, depending on the type of parachute.

Naturally, the invention is in no way limited to the embodiments described and illustrated; it is capable of numerous variants within the scope of the specialist, depending on the uses envisaged, and without thereby going beyond the spirit of the invention.

I claim:

1. A parachute adapted to have a component of movement along a longitudinal axis, comprising:
   a canopy having a forward part and a rear part and including a plurality of substantially square fabric panels,
   said fabric panels disposed near the center of said canopy having a greater porosity than said fabric panels disposed near the periphery of said canopy;
   a harness for carrying a load; rigging lines fixed at one end to said periphery of said canopy, and at their opposite ends to said harness; a plurality of nozzles disposed on a convex surface of said canopy, each having an outlet opening directed towards said rear part of said canopy; a cut-out portion in a leading edge of said forward part of said canopy on said longitudinal axis of movement; and a cut-out portion in a trailing edge of said rear part of said canopy on said longitudinal axis of movement.

2. A parachute adapted to have a component of movement along a longitudinal axis, comprising:
   a canopy having a forward part and a rear part;
   at least two reinforcing bands disposed at an angle to said longitudinal axis of movement and to each other, each extending from a first point on the periphery of said canopy through the center of said canopy to a second point on said periphery of said canopy opposite said first point;
   a harness for carrying a load;
   rigging lines fixed at one of their ends to the periphery, and at the opposite ends to said harness;
   a plurality of nozzles disposed on a convex surface of said canopy, each having an outlet opening directed towards said rear part of said canopy;
   a cut-out portion in a leading edge of said forward part of said canopy on said longitudinal axis of movement, and
   a cut-out portion in a trailing edge of said rear parts of said canopy on said longitudinal axis of movement.

3. A parachute adapted to have a component of movement along a longitudinal axis, comprising:
   a canopy having a forward part and a rear part;
   a harness for carrying a load;
   rigging lines fixed at one of their ends to the periphery of said canopy, and at the opposite ends to said harness;
   a plurality of nozzles disposed on a convex surface of said canopy, each having an outlet opening directed towards said rear part of said canopy, at least one of said nozzles comprises an anti-shock slot, said slot being normally kept closed by means of a tie;
   a cut-out portion in a leading edge of said forward part of said canopy on said longitudinal axis of movement; and
   a cut-out portion in a trailing edge of said rear part of said canopy on said longitudinal axis of movement.

* * * * *